(12) United States Patent
Chua et al.

(10) Patent No.: US 9,507,430 B2
(45) Date of Patent: Nov. 29, 2016

(54) GESTURE SENSING MODULE

(71) Applicant: LITE-ON SINGAPORE PTE. LTD., Midview (SG)

(72) Inventors: Seng-Yee Chua, Singapore (SG); Tong-Tee Tan, Singapore (SG); Lee-Cheng Tay, Singapore (SG)

(73) Assignee: LITE-ON SINGAPORE PTE. LTD., Midview (SG)

( * ) Notice: Subject to any disclaimer, the term of this patent is extended or adjusted under 35 U.S.C. 154(b) by 62 days.

(21) Appl. No.: 14/623,097

(22) Filed: Feb. 16, 2015

(65) Prior Publication Data

US 2016/0239093 A1   Aug. 18, 2016

(51) Int. Cl.
*G06F 3/01*   (2006.01)

(52) U.S. Cl.
CPC .................... *G06F 3/017* (2013.01)

(58) Field of Classification Search
CPC ...... G06F 3/044; G06F 3/0416; G06F 3/017; G06F 19/3462; G06F 19/3475; G06F 19/3481; G06F 3/03547; G06F 3/0418; G06F 3/0425; G06F 3/04883; G06F 17/30241; G06F 1/1652; G06F 1/3262; G06F 3/0421; G06F 2203/04103; G06F 3/0304; G06F 3/0414; G06F 3/0428; G06F 3/04842; G06F 3/0488; G06F 1/1616; G06F 1/163; G06F 1/1643

USPC ................... 345/175; 602/40–54, 19
See application file for complete search history.

(56) References Cited

U.S. PATENT DOCUMENTS

| 8,675,706 | B2 * | 3/2014 | Seurin | F21V 29/70 372/50.124 |
| 9,223,407 | B2 * | 12/2015 | Hsu | H04N 5/04 |
| 2011/0004327 | A1 * | 1/2011 | Bonnat | G06F 3/011 700/83 |
| 2013/0328770 | A1 * | 12/2013 | Parham | G06F 3/0304 345/157 |
| 2014/0002410 | A1 * | 1/2014 | Lillie | G06F 3/041 345/174 |

\* cited by examiner

*Primary Examiner* — Michael Brown
(74) *Attorney, Agent, or Firm* — Li & Cai Intellectual Property (USA) Office

(57) ABSTRACT

An exemplary embodiment of the present disclosure illustrates a gesture sensing module disposed on a substrate. The gesture sensing module includes at least one light emitting unit, at least one light sensor, and a control circuit. The light emitting unit provides a light to illuminate a sensing area, wherein a central optical axis of the light forms an angle with a normal vector of the substrate, and the angle is not equal to 0. The light sensor senses a reflection light which a target in the sensing area reflects the light, and generate a sensing signal according to the reflection light. The control circuit coupled to the light sensor and the light emitting unit determines a traveling direction of the target according to the sensing signal.

8 Claims, 9 Drawing Sheets

1

GESTURE SENSING MODULE

BACKGROUND

1. Technical Field

The present disclosure relates to a sensing module, in particular, to a gesture sensing module.

2. Description of Related Art

Today, most touch control based mobile devices replace the traditional keyboards with the virtual keyboards on a touch control screen, or upgrades the touch control function to have specific directionality operations. The user can use a simple gesture to operate the mobile device to zoom in or out object on the screen of the mobile device. However, in the current technique, the user must touch the screen of the mobile device to operate the mobile device.

Multiple sensing methods of various types have been illustrated in the current market, such as a sound sensing method, a gesture sensing method, and so on, wherein a plurality of light sources and a plurality of light sensors are disposed in the mobile device to implement the gesture sensing method, such that the user can operate the mobile device without touching the screen of the mobile device.

Referring to FIG. 1, FIG. 1 is a curve diagram showing a normalized response amplitude of the sensing signal obtained by a conventional gesture sensing module. The curve C100 represents the variation of normalized response amplitude at each time which each of the light sensors senses. By comparing the sensing signals generated by multiple light sensors, the mobile device can determines the operation instruction of the user.

SUMMARY

An exemplary embodiment of the present disclosure provides a gesture sensing module. The gesture sensing module is disposed on a substrate, and includes at least one light emitting unit, at least one light sensor, and a control circuit, wherein the control circuit is coupled to the light sensor and the light emitting unit. The light emitting unit provides a light to irradiate a sensing area, wherein a central optical axis of the light forms an angle with a normal vector of the substrate, and the angle is not equal to 0. The light sensor senses a reflection light which a target in the sensing area reflects the light, and generates a sensing signal according to the reflection light. The control circuit determines a traveling direction of the target according to the sensing signal.

To sum up, the gesture sensing module provided by the exemplary embodiment of the present disclosure can sense the traveling direction (for example, from left to right, from right to left, from top to bottom, or from bottom to top) of the target by using at least one light emitting unit and at least one light sensor.

In order to further understand the techniques, methods and effects of the present disclosure, please refer to the following detailed descriptions and appended figures, such that the purposes, features of the present disclosure can be thoroughly and concretely understood. However, the appended figures are merely provided for reference and illustration, without any intention to be used for limiting the present disclosure.

DESCRIPTION OF THE EXEMPLARY EMBODIMENTS

Figure 1:
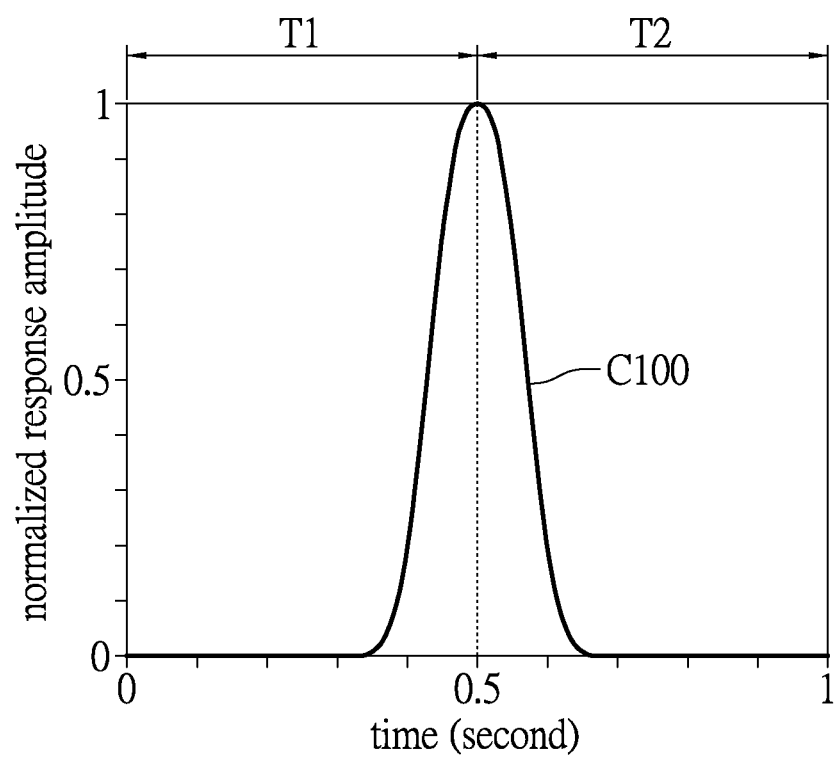
FIG. 1 is a curve diagram showing a normalized response amplitude of the sensing signal obtained by a conventional gesture sensing module.

Reference will now be made in detail to the exemplary embodiments of the present disclosure, examples of which are illustrated in the accompanying drawings. Wherever possible, the same reference numbers are used in the drawings and the description to refer to the same or like parts.

(Exemplary Embodiment of Gesture Sensing Module)

Figure 2A:
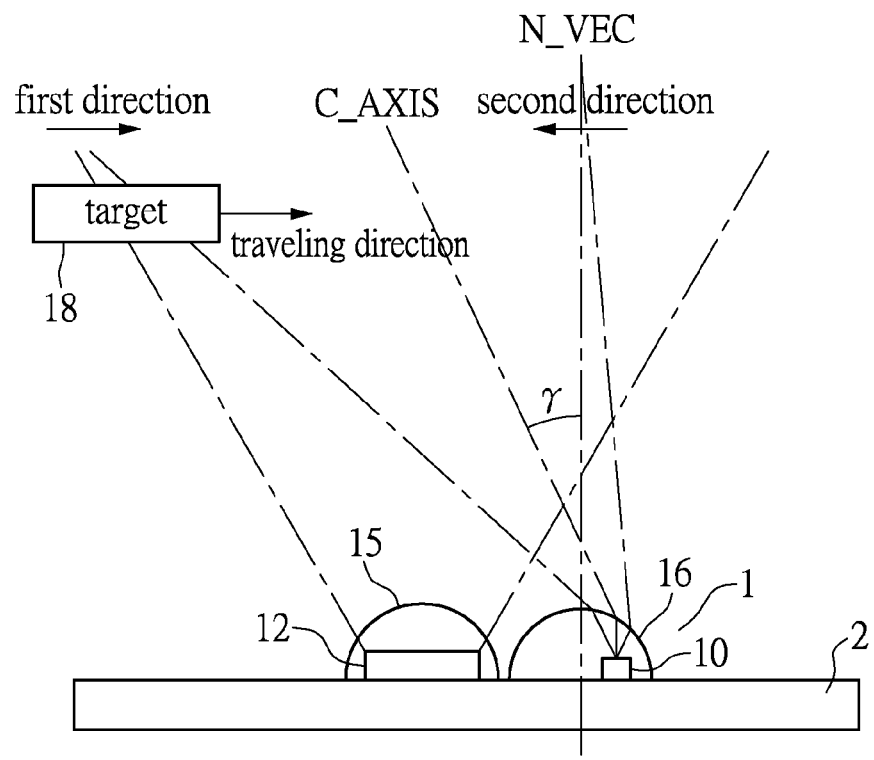
FIG. 2A is a schematic diagram showing an operation of a gesture sensing module according to an exemplary embodiment of the present disclosure.
Figure 2B:
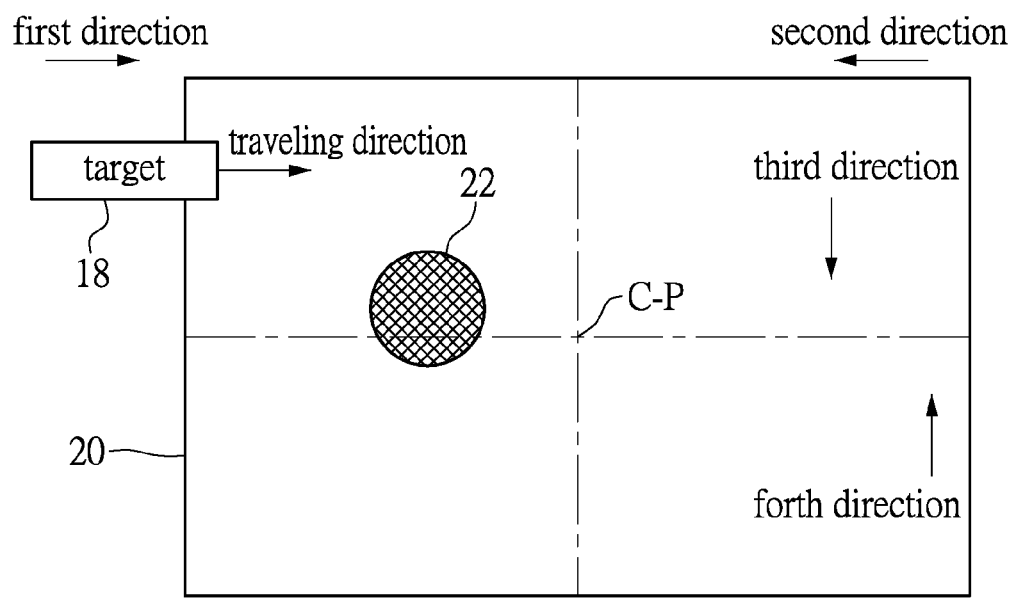
FIG. 2B is a schematic diagram of a sensing area of the gesture sensing module of FIG. 2A.
Figure 2C:
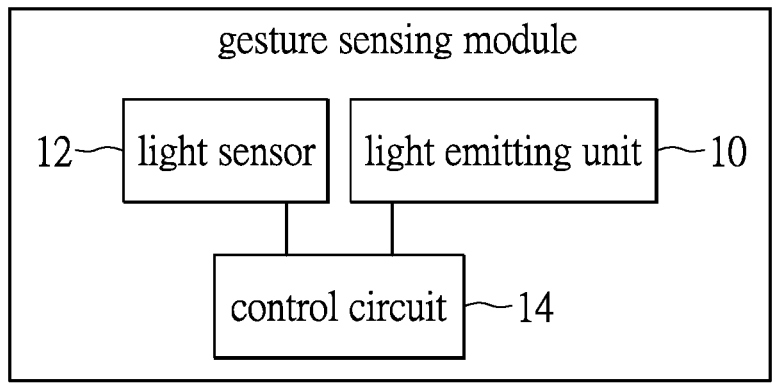
FIG. 2C is a function block diagram of a gesture sensing module according to an exemplary embodiment of the present disclosure.

Referring to FIG. 2A through FIG. 2C, FIG. 2A is a schematic diagram showing an operation of a gesture sensing module according to an exemplary embodiment of the present disclosure, FIG. 2B is a schematic diagram of a sensing area of the gesture sensing module of FIG. 2A, and FIG. 2C is a function block diagram of a gesture sensing module according to an exemplary embodiment of the present disclosure. The gesture sensing module 1 is disposed above a substrate 2, and includes at least one light emitting unit 10, at least one light sensor 12, and a control circuit 14, wherein the control circuit 14 is coupled to the light emitting unit 10 and the light sensor 12.

The light emitting unit 10 provides a light to irradiate a sensing area 20, wherein a central optical axis C_AXIS of the light forms an angle γ with a normal vector N_VEC of the substrate 2, and the angle γ is not equal to 0. The light sensor 12 senses a reflection light which a target 18 in the sensing area 20 reflects the light, and generates a sensing signal according to the reflection light. The control circuit 14 determines a traveling direction of the target 18 according to the sensing signal.

It is worth mentioning that, in the exemplary embodiment, a first optical lens 15 (such as a convex lens) can be disposed above the light sensor 12, and the first optical lens 15 is used to receive the reflection light which the target 18 reflects the light, and to focus the reflection light on the light sensor 12. In addition, in the exemplary embodiment, the a second optical lens 16 (such as a convex lens) can be disposed above the light emitting unit 10, and the second optical lens 16 is used to shift central optical axis C_AXIS of the light emitted by the light emitting unit 10 away from the normal vector N_VEC of the substrate 2, such that the central optical axis C_AXIS of the light forms an angle γ with the normal vector N_VEC of the substrate 2. To put it concretely, a center point of an orthographic projection of the second optical lens 16 and a center point of an orthographic projection of the light emitting unit 10 are non-overlapped, thus the light emitted by the light emitting unit 10 is shifted away from normal vector N_VEC of the substrate 2, and the central optical axis C_AXIS of the light forms an angle γ with the normal vector N_VEC of the substrate 2.

In short, not being like the prior art that the light emitting by the light emitting unit is vertical to the substrate, the light emitted by the light emitting unit 10 is inclined to the substrate 2. Thus, the sensing signal obtained by the light sensor 12 has some differentiation in timing diagram due to different hand gestures, and the control circuit 14 can determine the type of the gesture according to the sensing signal.

Furthermore, the light sensor 12 can be a photo diode, and the light emitting unit 10 can be a light emitting diode (LED). However, the present disclosure does not limit the types of the light sensor 12 and the light emitting unit 10. In addition, the first optical lens 15 and the second optical lens 16 can be the glass convex lens, but the present disclosure is not limited thereto. The first optical lens 15 and the second optical lens 16 can be combinations of multiple lens, which have the focusing effects.

Please refer to FIG. 2A through FIG. 2C. The light sensor 12 forms the sensing area 20, wherein the sensing range of sensing area 20 is about 40 degree to −40 degree, and light emitting unit 10 provides the light with tilting −20 degree to irradiate sensing area 20. The light forms a left-shifted light spot 22 in the sensing area 20, as shown in FIG. 2B. In other word, the light does not irradiate a center point C_P of the sensing area 20. When a target 18, such as the hand of the user, moves along with a first direction (from left to right) from one side (left side) of the sensing area 20, the target 18 is firstly irradiated by the light. The nearer the target 18 moves to the light spot 22, the more reflection light which the target 18 reflects the light provided by the light emitting unit 10 is. In other word, the further the target 18 moves away from the light spot 22, the less the reflection light which the target 18 reflects the light provided by the light emitting unit 10 is. The light sensor 12 can sense the variation of the reflection light, generate a sensing signal accordingly, and then transfer the sensing signal to control circuit 14. The control circuit 14 determines the traveling direction of the target 18 according to the sensing signal.

Figure 2D:
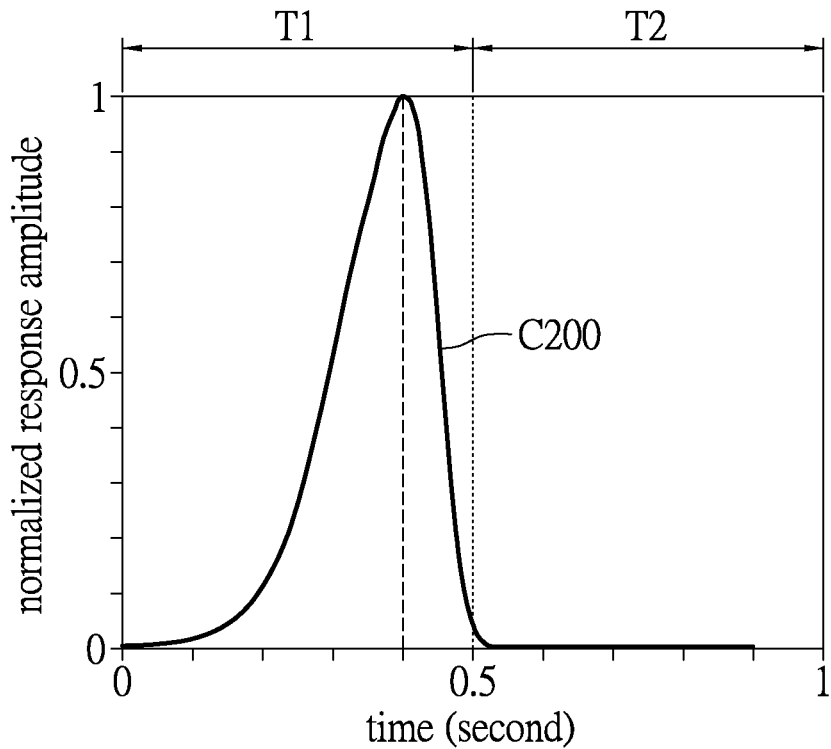
FIG. 2D is a curve diagram showing a normalized response amplitude of the sensing signal obtained by the gesture sensing module of FIG. 2A in the time domain.

Please refer to FIG. 2D, FIG. 2D is a curve diagram showing a normalized response amplitude of the sensing signal obtained by the gesture sensing module of FIG. 2A in the time domain. In FIG. 2D, the vertical axis represents normalized response amplitude which has the maximum value of 1, and the transverse axis represents the normalized time axis. The curve C200 represents the variation of normalized response amplitude at each time. In addition, in FIG. 2D, a whole time interval is divided to a first time interval T1 and a second time interval T2.

From FIG. 2D, it is known that since the light emitting unit 10 provides a light with tilting −20 degree to irradiate the sensing area 20, the nearer the target 18 moves the top of the light spot 22, the more the reflection light which target 18 reflects the light is, when the target 18 moves along with the first direction to pass the sensing area. At this moment, the amplitude of the reflection light increases gradually, and the light sensor 12 generates a sensing signal according to the variation of sensing signal.

Since the light which the light emitting unit 10 provides is left-shifted and the traveling direction of the target 18 is the first direction, the target 18 is irradiated at the beginning Hence, the sensing signal generated by the light sensor 12 rises gradually within a rising time of the sensing signal. When the target 18 passes the top of the light spot 22 and continues moves the other side of the sensing area 20 along with the first direction, the reflection light which the target 18 reflects the light reduces. The reflection light which the light sensor 12 senses also reduces relatively, such that the sensing signal generated by the light sensor 12 decreases quickly within a falling time of the sensing signal. Therefore, the control circuit 14 can determine the traveling direction of the target 18 is the first direction or a second direction (from right to left) according to the variation of sensing signal within the rising time and the falling time of the sensing signal.

For example, since the light emitting unit 10 provides a light being left-shifted, and the traveling direction of the target 18 is the first direction, the light emitting unit 10 irradiates the target 18 firstly, and the light sensor 12 gradually senses the maximum reflection light. Accordingly, the rising time of the sensing signal is longer than the falling time of the sensing signal, p.s. the rising time is generally defined as the time that the normalized response amplitude increases from 0.1 to 0.9. However, the present disclosure does not limit the definition of the rising time. When the target 18 leaves the light spot 22 along with the first direction, the falling time of the sensing signal is shorter than the rising time of the sensing signal, p.s. the falling time is generally defined as the time that the normalized response amplitude decreases from 0.9 to 0.1. However, the present disclosure does not limit the definition of the falling time.

It is thus known that the control circuit 14 can determine the traveling direction of the target 18 according to the variation of sensing signal within the rising time and the falling time of the sensing signal. For example, the control circuit 14 can determine the traveling direction of target 18 according to a slope within the rising time of the sensing signal and a slope within the falling time of the sensing signal. When the slope within the rising time of the sensing signal is less than the slope within the falling time of the sensing signal, the control circuit 14 determines the traveling direction of the target 18 is the first direction. On the contrary, when the slope within the rising time of the sensing signal is greater than the slope within the falling time of the sensing signal, the control circuit 14 determines the traveling direction of the target 18 is the second direction.

It is worth mentioning that, the control circuit 14 also can determine the traveling direction of the target 18 according to a brightness integral value within the rising time of the sensing signal and a brightness integral value within the falling time of the sensing signal, p.s. the brightness integral value is an integral value of the normalized response amplitude. When the brightness integral value within the rising time of the sensing signal is greater than the brightness integral value within the falling time of the sensing signal, the control circuit 14 determines the traveling direction of the target 18 is the first direction. On the contrary, when the brightness integral value within the rising time of the sensing signal is less than or equal to the brightness integral value within the falling time of the sensing signal, the control circuit 14 determines the traveling direction of the target 18 is the second direction.

In another exemplary embodiment, the control circuit 14 also can determine the traveling direction of the target according to a proportion of the rising time to the falling time of the sensing signal. For example, when the proportion of the rising time to the falling time of the sensing signal is greater than 1, the control circuit 14 determines the traveling direction of the target 18 is the first direction. On the contrary, when the proportion of the rising time to the falling time of the sensing signal is less than 1, the control circuit 14 determines the traveling direction of the target is the second direction. In short, the present disclosure does not limit the determination manner of the control circuit 14, and the control circuit 14 can determine the traveling direction of the target 18 according to the slope within the rising time of the sensing signal and the slope within the falling time of the sensing signal, the brightness integral value within the rising time of the sensing signal and the brightness integral value within the falling time of the sensing signal, or the proportion of the rising time to the falling time of the sensing signal.

Figure 3:
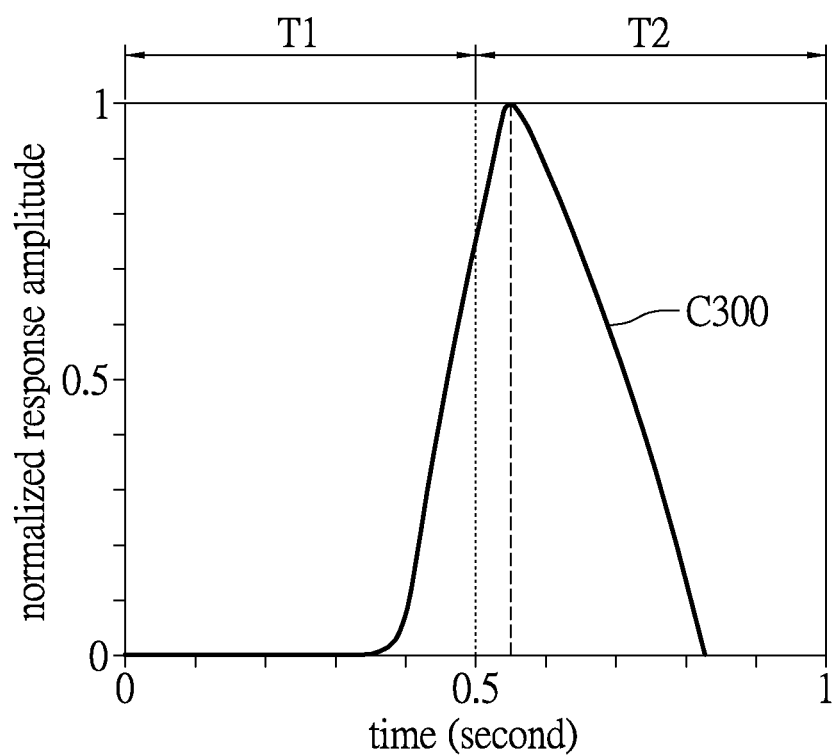
FIG. 3 is a curve diagram showing a normalized response amplitude of the sensing signal obtained by a gesture sensing module in the time domain according to another exemplary embodiment of the present disclosure.
Figure 4A:
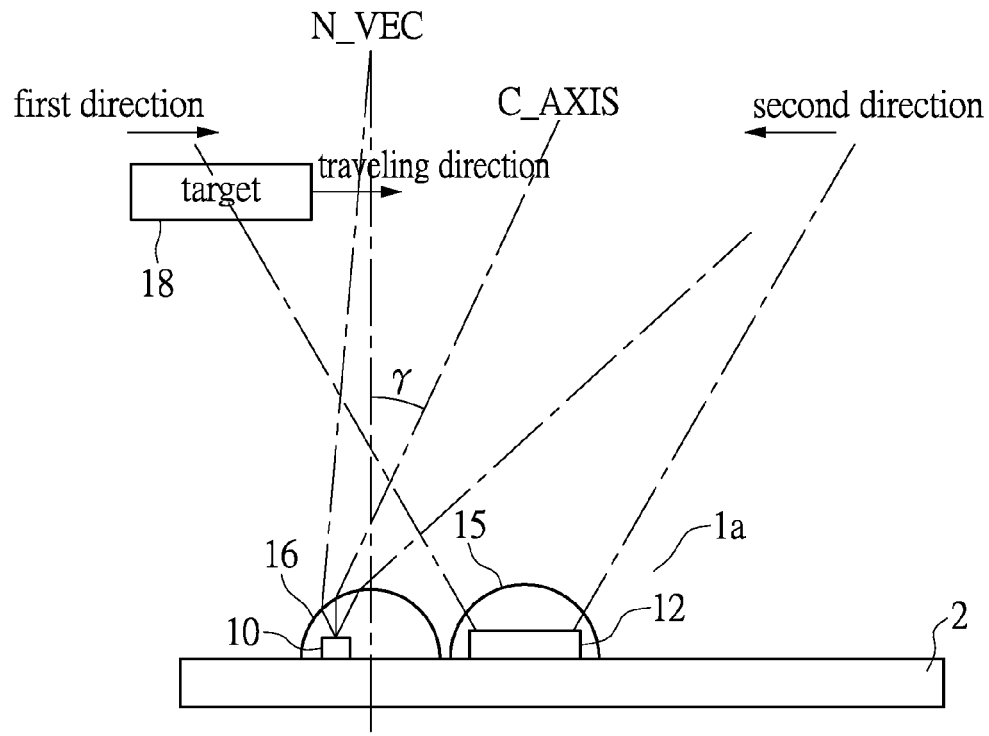
FIG. 4A shows an operation diagram of the gesture sensing module according to the second exemplary embodiment of the present disclosure.
Figure 4B:
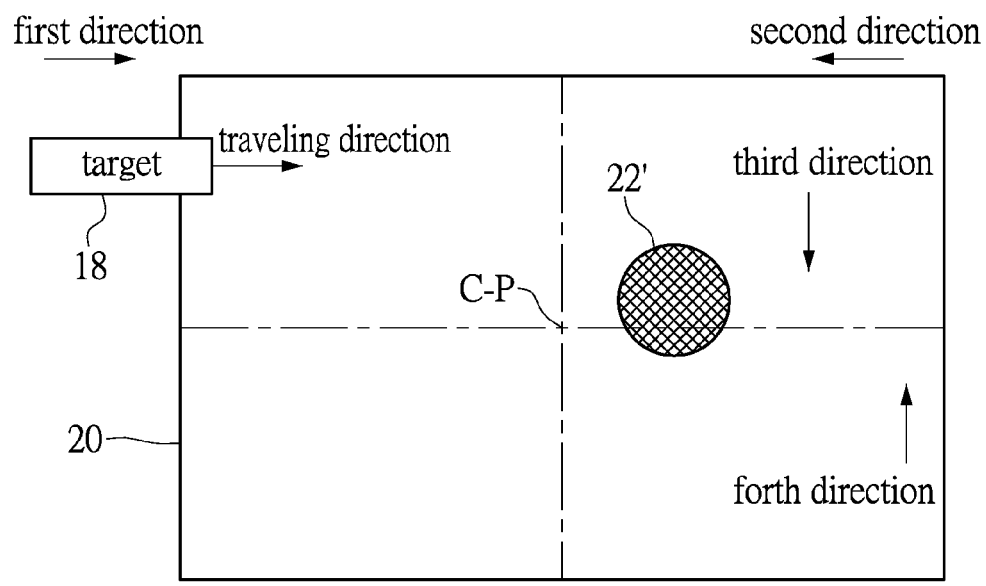
FIG. 4B is a schematic diagram of a sensing area of the gesture sensing module of FIG. 4A.
Figure 4C:
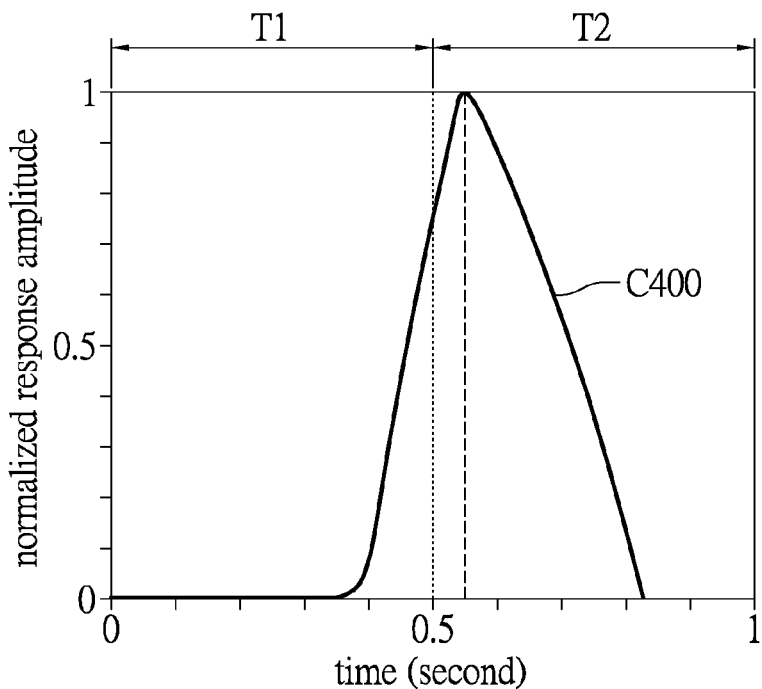
FIG. 4C is a curve diagram showing a normalized response amplitude of the sensing signal obtained by the gesture sensing module of FIG. 4A in the time domain.
Figure 4D:
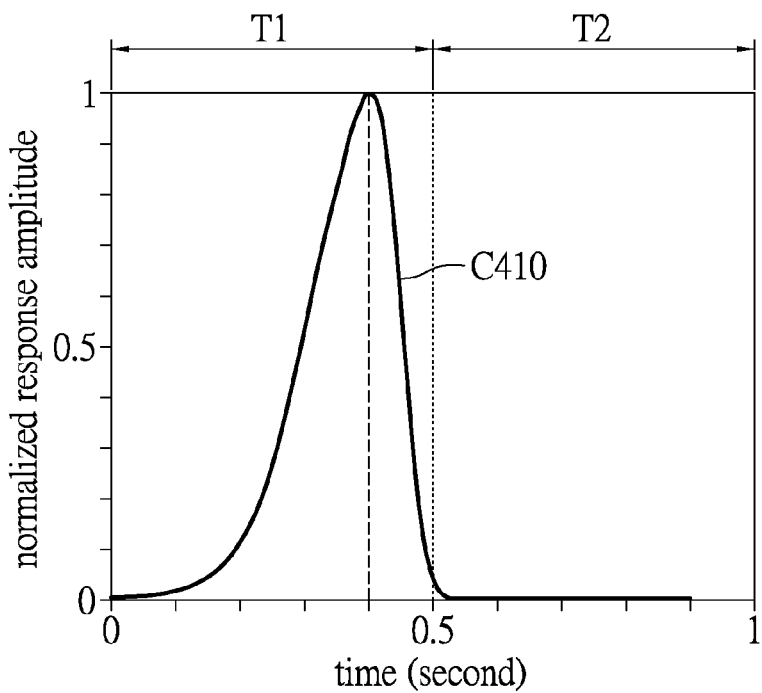
FIG. 4D is a curve diagram showing a normalized response amplitude of the sensing signal obtained by a gesture sensing module in the time domain according to another exemplary embodiment of the present disclosure.

On the other hand, referring to FIG. 3, FIG. 3 is a curve diagram showing a normalized response amplitude of the sensing signal obtained by a gesture sensing module in the time domain according to another exemplary embodiment of the present disclosure. The vertical axis and the transverse axis in FIG. 3 have the units similar to those in FIG. 2D, and the descriptions of the vertical axis and the transverse axis in FIG. 3 are thus omitted. When the target 18 moves along with the second direction from the right side of the sensing area 20, the target 18 is not be irradiated by a light provided by the light emitting unit 10 firstly, but the target 18 is irradiated by a light when the target 18 approaches the left side of the sensing area 20, such that the reflection light is increased, and the light sensor 12 receives the reflection light which the target 18 reflects the light. Therefore, in FIG. 3, as shown by the curve C300, the rising time of the sensing signal is relatively short, and when the target 18 approaches the left side of the sensing area 20, the falling time of the sensing signal is relatively long.

It can be seen that the control circuit 14 can determine the traveling direction of the target 18 according to the slope within the rising time of the sensing signal and the slope within the falling time of the sensing signal, the brightness integral value within the rising time of the sensing signal and the brightness integral value within the falling time of the sensing signal, or the proportion of the rising time to falling time of the sensing signal. For example, the control circuit 14 determines that the traveling direction of the target 18 is the second direction when the slope within the rising time of the sensing signal is greater than the slope within the falling time of the sensing signal; or alternatively, the control circuit 14 determines the traveling direction of the target 18 is the second direction when the brightness integral value within the rising time of the sensing signal is less than the brightness integral value within the falling time of the sensing signal; or alternatively, the control circuit 14 determines the traveling direction of the target 18 is the second direction when the proportion of the rising time to the falling time is less than 1.

Please note that though the above exemplary embodiment only illustrates the control circuit 14 can determine the traveling direction of the target 18 is the first direction or the second direction according to the rising time and the falling time of the sensing signal, as shown in FIG. 2B, the gesture sensing module 1 in the above exemplary embodiment of the present disclosure also can determine the traveling direction of the target 18 is a third direction (from top to bottom) or a fourth direction (from bottom to top) according to the rising time and the falling time of the sensing signal. In short, the present disclosure is not limited thereto.

Please note that, the above exemplary embodiment is only an exemplary embodiment for the present disclosure, and the present disclosure is not limited thereto. In another exemplary embodiment of the present disclosure, the light emitting unit 10 also can provide a light with tilting 20 degree to irradiate the sensing area 20, such as the exemplary embodiment which FIG. 4A through FIG. 4D shown.

Figure 5:
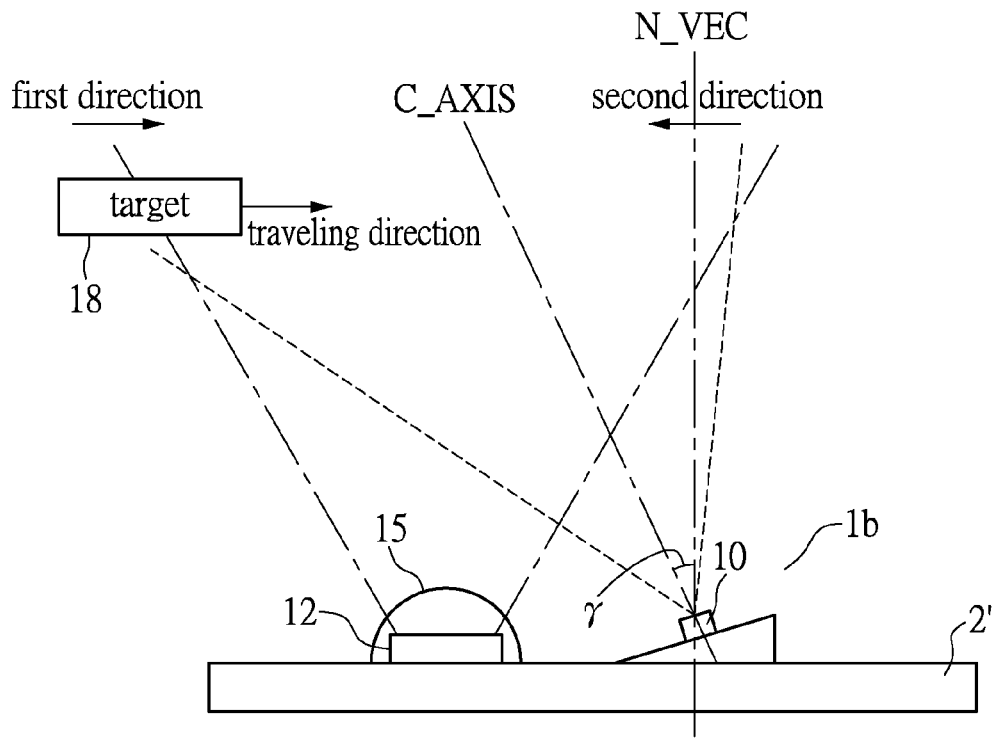
FIG. 5 is a schematic diagram showing an operation of a gesture sensing module according to another exemplary embodiment of the present disclosure.

It is worth to note that the light emitting unit 10 can be disposed on the inclined surface to provide a tilting light (ex: tilting 20 degree or −20 degree) to irradiate the sensing area 20 in another exemplary embodiment of the present disclosure, such as the exemplary embodiment which FIG. 5 shown. However, the present disclosure is not limited thereto.

In summary, the light emitting unit 10 of the gesture sensing module 1 of the present disclosure provides a light to irradiate the sensing area 20, wherein a central optical axis C_AXIS of the light is tilted to a normal vector N_VEC of the substrate 2. Since the light which the light emitting unit 10 provides does not irradiate the center point C_P of the sensing area 20, by receiving the sensing signal, the control circuit 14 can determine the traveling direction of the target 18 according to the slope within the rising time of the sensing signal and the slope within the falling time of the sensing signal, the brightness integral value within the rising time of the sensing signal and the slope within the falling time of the sensing signal, or the proportion of the rising time to the falling time of the sensing signal, wherein the light sensor 12 senses the reflection light which the target 18 reflects the light, and generate the sensing signal accordingly.

In short, the gesture sensing module 1 provided by the above exemplary embodiment of the present disclosure can directly sense the intensity variation of the reflection light reflected by the target 18 within a sensing time, and can determine the operation instruction of the user accordingly. Hence, computation of the back-end circuit can be reduced. In addition, since the user can operate electronic apparatus using the gesture sensing module 1 without touching the electronic apparatus, the flexibility of operation is increased.

(Another Exemplary Embodiment of Gesture Sensing Module)

Figure 6:
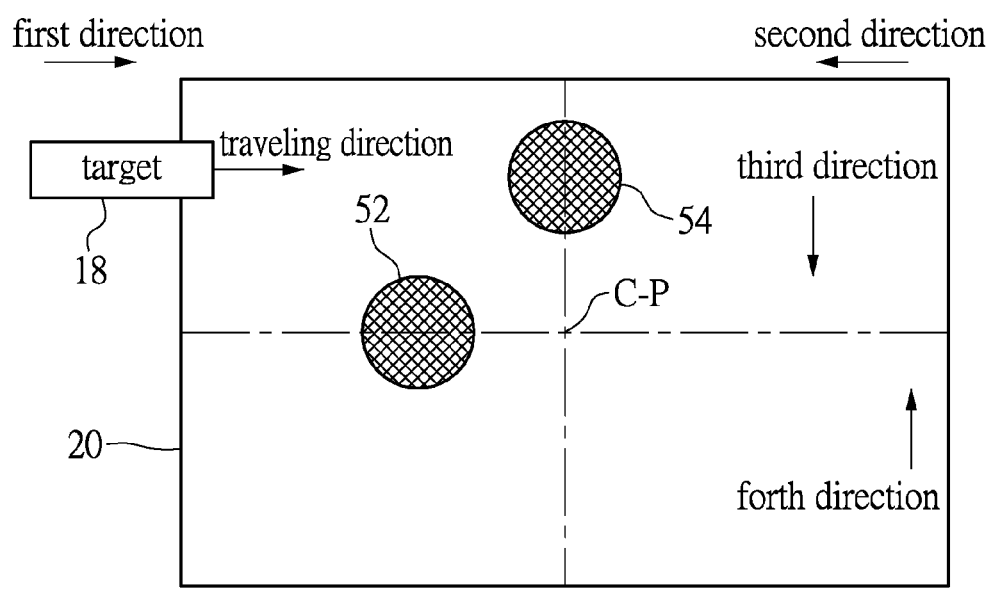
FIG. 6 is a schematic diagram of a sensing area of the gesture sensing module according to another exemplary embodiment of the present disclosure.

Referring to FIG. 6, FIG. 6 is a schematic diagram of a sensing area of the gesture sensing module according to another exemplary embodiment of the present disclosure. The structure of the gesture sensing module (not shown in the drawings) of the exemplary embodiment is similar to the structures of the gesture sensing modules 1 in FIG. 2A described above, and thus the similar elements of the sensing modules 1 are labeled with the identical numerals. The difference between the gesture sensing module in the exemplary embodiment and the gesture sensing module in the exemplary embodiments described above is that the gesture sensing module exemplary embodiment has two light emitting units, and the two light emitting units (not shown in the drawings) respectively provide two tilting lights to irradiate the sensing area 20. As shown in FIG. 6, there are two light spots in the sensing area 20, and these two light spots are offset to the center point C_P of the sensing area 20.

Therefore, in the exemplary embodiment, the control circuit 14 not only can determine the traveling direction of the target 18 is a first direction or a second direction according to a slope within a rising time of the first sensing signal (generated from the reflection light which the target reflects the light of the light spot 52) and a slope within a falling time of the first sensing signal, a brightness integral value within the rising time of the first sensing signal and a brightness integral value within a falling time of the first sensing signal, or a proportion of a rising time to a falling time of the first sensing signal, but also can determine the traveling direction of the target 18 is a third direction or a fourth direction according to a slope within a rising time of the second sensing signal (generated from the reflection light which the target reflects the light of the light spot 54) and a slope within a falling time of the second sensing signal, a brightness integral value within the rising time of the second sensing signal and a brightness integral value within a falling time of the second sensing signal, or a proportion of a rising time to a falling time of the second sensing signal.

In the exemplary embodiment, the gesture sensing module has two light emitting units, and the two light emitting units provide two tilting lights to irradiate the sensing area 20. However, the gesture sensing module also can have three or four light emitting units in other exemplary embodiment. The present disclosure is not limited the number of light emitting units.

In addition to the differences explained above, the manner that the control circuit 14 of the gesture sensing module of the exemplary embodiment determines the travel direction of the target 18 is similar to the manners that the control circuit 14 of the gesture sensing module (determines the travel direction of the target 18. Thus, the person with ordinary skill in the art can deduce the details of the manner that the control circuit 14 of the gesture sensing module of the exemplary embodiment determines the travel direction of the target 18 according to the description of the gesture sensing modules in the above exemplary embodiments and the explained difference, thus omitting the redundant description. In another exemplary embodiment, the gesture sensing module can have more than one light sensor, and by adapting a suitable algorithm and disposing multiple light sensors, the accuracy which the control unit determines the traveling direction of the target can be enhanced.

(Exemplary Embodiment of Electronic Apparatus)

Figure 7:
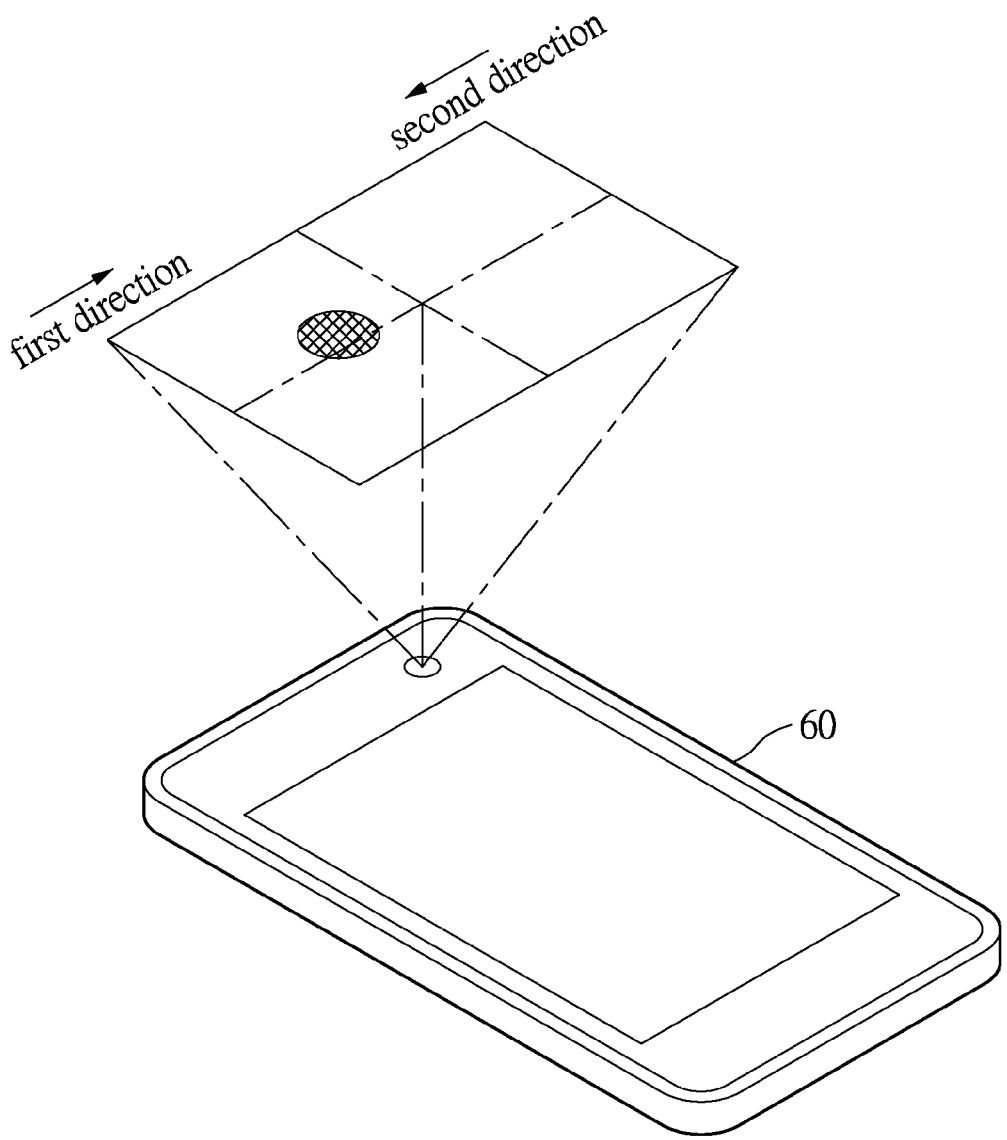
FIG. 7 is a schematic diagram of an electronic apparatus according to an exemplary embodiment of the present disclosure.

Please refer to FIG. 7 FIG. 7 is a schematic diagram of an electronic apparatus according to an exemplary embodiment of the present disclosure. The gesture sensing module 1 described above can be utilized directly in the electronic apparatus 60, but the present disclosure is not limited thereto. The electronic apparatus 60 generally includes the gesture sensing module 1 and a processing unit (not shown in the drawings), wherein the processing unit is coupled to the gesture sensing module 1. The processing unit executes an application operation according to the traveling direction determined by the gesture sensing module 1. In addition, the electronic apparatus 60 described above can be a phone, a tablet computer, or a notebook.

(Exemplary Embodiment of Gesture Sensing Method)

Figure 8:
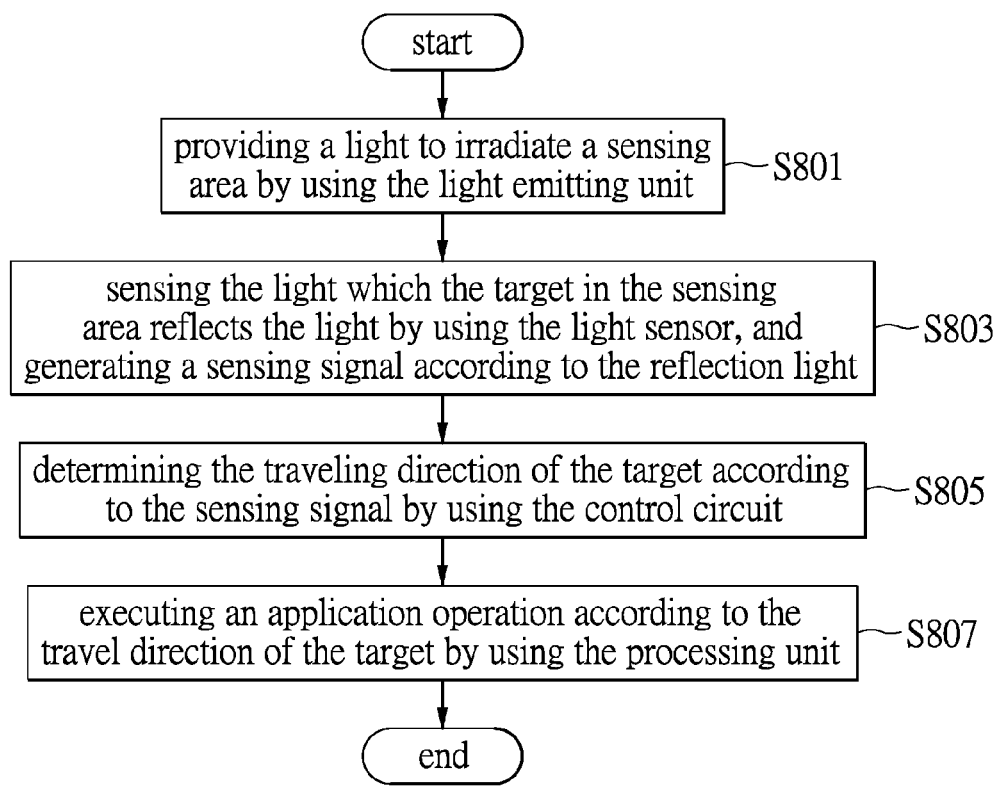
FIG. 8 is a flow chart of a gesture sensing method according to an exemplary embodiment of the present disclosure.

Referring to FIG. 2A (FIG. 4A, or FIG. 5) and FIG. 8, FIG. 8 is a flow chart of a gesture sensing method according to an exemplary embodiment of the present disclosure. At step S801, a light emitting unit 10 provides a light to irradiate a sensing area 20, wherein a central optical axis C_AXIS of the light forms an angle γ with a normal vector N_VEC of a substrate 2. In the exemplary embodiment, the angle γ can be 20 degree (or −20 degree). However, the present disclosure is not limited thereto. In other exemplary embodiment, the person with ordinary skill in the art can design the degree according to actual usage condition. In other words, the light emitting unit 10 provides a tilting light to irradiate the sensing area 20, such that the light provided by the light emitting unit 10 does not irradiate the center point C_P of the sensing area 20.

At step S803, the light sensor 12 senses the reflection light which a target 18 reflects the light and generates a sensing signal. It is noted that, the sensing signal represents the intensity variation of the reflection light which the target 18 reflects the light in each time. At step S805, the control circuit 14 can determine a traveling direction of the target 18 according to the sensing signal. At step S807, the process unit can execute an application operation according to a determination result made by the control circuit 14.

(Possible Result of Exemplary Embodiment)

In summary, the gesture sensing module, method, and the electronic apparatus thereof provided by the exemplary embodiments of the present disclosure can sense the traveling direction of the target utilizing at least one light emitting unit and at least one light sensor. Therefore, the gesture sensing module, the method, and the electronic apparatus described above can determine various operations, such that the operation flexibility of the user is increased, and the computation of the back-end circuit is decreased.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A gesture sensing module, disposed on a substrate, comprising:
   at least one light emitting unit, providing a light to irradiate a sensing area, wherein a central optical axis of the light forms an angle with a normal vector of the substrate, and the angle is not equal to 0;
   at least one light sensor, sensing a reflection light which a target in the sensing area reflects the light, and generating a sensing signal according to the reflection light; and
   a control circuit, coupled to the light sensor and the light emitting unit, determining a traveling direction of the target according to the sensing signal;
   wherein the substrate has a inclined surface, and the light emitting unit is disposed on the inclined surface of the substrate, such that the angle formed by the central optical axis of the light and the normal vector of the substrate is not equal to 0.

2. The gesture sensing module according to claim 1, wherein the control circuit determines the traveling direction of the target according to a slope within a rising time of the sensing signal and a slope within a falling time of the sensing signal.

3. The gesture sensing module according to claim 1, wherein the control circuit determines the traveling direction of the target according to a proportion of a rising time to a falling time of the sensing signal.

4. The gesture sensing module according to claim 1, wherein the control circuit determines the traveling direction of the target according to a brightness integral value within a rising time of the sensing signal and a brightness integral value within a falling time of the sensing signal.

5. The gesture sensing module according to claim 1, wherein the angle formed by the central optical axis of the light and the normal vector of the substrate is 20 degree or −20 degree.

6. The gesture sensing module according to claim 1, further comprising:
   a first optical lens, disposed above the light sensor, receiving the reflection light, and focusing the reflection light on the light sensor.

7. The gesture sensing module according to claim 1, wherein the light sensor comprises at least one photo diode.

8. The gesture sensing module according to claim 1, further comprising:
   a second optical lens, disposed above the light emitting unit, wherein a center point of an orthographic projection of the second optical lens and a center point of an orthographic projection of the light emitting unit are non-overlapped, such that the angle formed by the central optical axis of the light and the normal vector of the substrate is not equal to 0.

* * * * *